US005950116A

United States Patent [19]
Baro

[11] Patent Number: 5,950,116
[45] Date of Patent: Sep. 7, 1999

[54] MOBILE TELEPHONE WITH OFF-CENTER ANTENNA

[75] Inventor: José Baro, Taverny, France

[73] Assignee: Alcatel Mobile Phones, Paris, France

[21] Appl. No.: 08/835,480

[22] Filed: Apr. 8, 1997

[51] Int. Cl.$^{6}$ .................................................. H04B 1/38

[52] U.S. Cl. ............................ 455/90; 455/128; 455/129; 343/702

[58] Field of Search ............................ 455/90, 575, 128, 455/129, 351, 347, 348, 349, 550; 343/702, 841, 906; H01Q 1/24

[56] References Cited

U.S. PATENT DOCUMENTS

| | | | |
|---|---|---|---|
| 5,336,896 | 8/1994 | Katz | 455/90 |
| 5,535,435 | 7/1996 | Balzano et al. | 343/702 |
| 5,541,609 | 7/1996 | Stutzman et al. | 455/575 |
| 5,590,416 | 12/1996 | Rydbeck | 455/575 |
| 5,694,137 | 12/1997 | Wood | 343/841 |
| 5,771,466 | 6/1998 | Tsugane et al. | 455/90 |

FOREIGN PATENT DOCUMENTS

| | | | |
|---|---|---|---|
| 0663734A1 | 7/1975 | European Pat. Off. . | |
| 404152703 | 5/1992 | Japan | H01Q 1/24 |
| 404334103 | 11/1992 | Japan | H01Q 1/14 |
| 2275369 | 8/1994 | United Kingdom . | |

*Primary Examiner*—Dwayne D. Bost
*Assistant Examiner*—Quochien B. Vuong
*Attorney, Agent, or Firm*—Sughrue, Mion, Zinn, Macpeak & Seas, PLLC

[57] ABSTRACT

A mobile telephone includes an antenna device attached to the casing of the telephone which includes an antenna cap covering an antenna which is situated near one wall of the antenna cap. The antenna device includes an off-centering arrangement such that, when the antenna device is fixed to the casing, the antenna is automatically placed and secured at the position farthest away from the head of the user. The antenna is therefore always separated from the head of the user by a minimal distance during a telephone call.

8 Claims, 1 Drawing Sheet

MOBILE TELEPHONE WITH OFF-CENTER ANTENNA

BACKGROUND OF THE INVENTION

1. Field of the Invention

The present invention concerns mobile telephone systems and in particular a mobile telephone in which the antenna is off-center so that it is as far away as possible from the head of the user.

2. Description of the Prior Art

In GSM type mobile telephone systems the user has a portable unit that is held in the hand with the earpiece in the upper part of the unit near the ear.

A unit of this kind generally has a short antenna fixed to the upper part of the casing and covered by an antenna cap approximately 3 cm high.

During a telephone call, the user tends to move the portable unit so that the antenna moves towards and away from the head. Movement of the antenna to a position close to the head of the user is a disadvantage. The fact that a biological mass, the head of the user, forming not only a dielectric mass but also a conductive body, is near the transmit antenna causes the flux lines of the electromagnetic waves emitted by the antenna to close through this mass so that some of the transmitted energy is absorbed.

For this reason the main aim of the invention is to provide a mobile telephone with the antenna always separated from the head of a user by a minimal distance during a telephone call during which the antenna may be subject to movements bringing it nearer to the head of the user.

SUMMARY OF THE INVENTION

The invention therefore consists in a mobile telephone including an antenna device attached to the casing of the telephone and comprising an antenna cap covering an antenna which is situated near one wall of the antenna cap, the antenna device including off-centering means such that, when the antenna device is fixed to the casing, the antenna is automatically placed at the position farthest away from the head of the user so that the antenna is always separated from the head of the user by a minimal distance during a telephone call during which the antenna device may be subject to movements such that it moves closer to the head of the user.

Other aims, objects and features of the invention will emerge more clearly from a reading of the following description with reference to the accompanying drawings.

DETAILED DESCRIPTION OF THE PREFERRED EMBODIMENT

Figure 1:
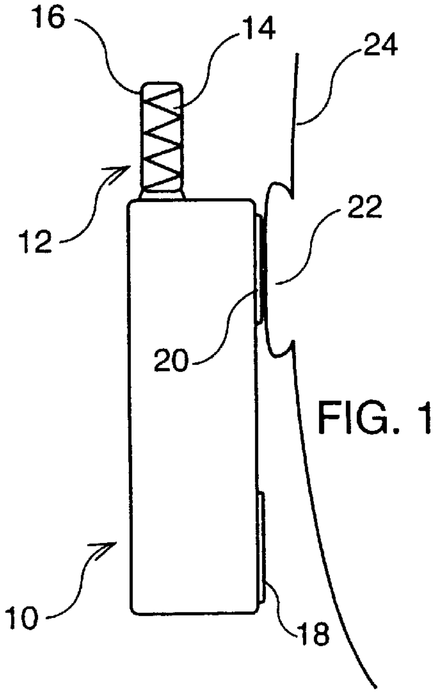
FIG. 1 is a schematic sectional representation of a conventional mobile telephone placed near the head of the user during a telephone call.

As shown schematically in FIG. 1, a modern mobile telephone comprises a casing 10 and an antenna device 12 attached to the casing 10. In the antenna device 12 is an antenna 14 covered by an antenna cap 16. The antenna 14 is often helical in shape, as in FIG. 1, and therefore occupies all of the interior space of the antenna cap, but can instead be of the wire type or of any other shape.

The casing of the mobile telephone has a microphone 18 and an earpiece 20 that is placed against the ear 22 of the user during a telephone call. As previously mentioned, the unit is subject to movements during a call which tend to move the antenna device 12 and therefore the antenna 14 closer to the head 24 of the user.

Figure 2:
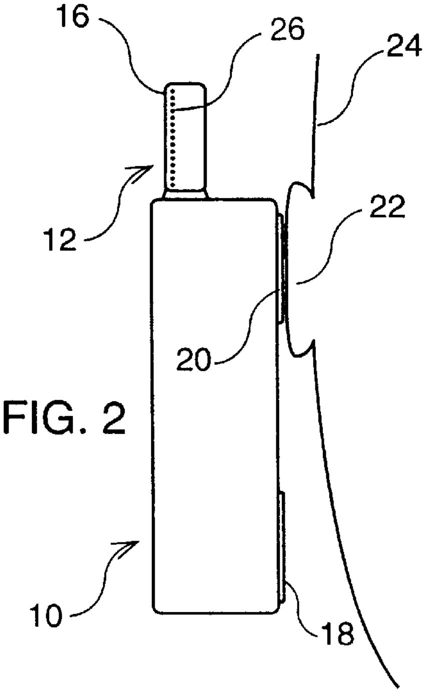
FIG. 2 is a schematic sectional representation of a mobile telephone of the invention placed near the head of the user during a telephone call.

The mobile telephone of the invention shown schematically in FIG. 2 is similar to that from FIG. 1 and the same reference numbers are therefore used. However, its antenna device 12 is a device in accordance with the invention, i.e. it prevents the antenna moving closer to the head of the user than a minimal distance in order to avoid the disadvantages mentioned hereinabove.

As can be seen in FIG. 2, the antenna 26 is near the inside wall of the antenna cap that is farthest from the head 24 of the user and is therefore off-center relative to the antenna cap.

Figure 3:
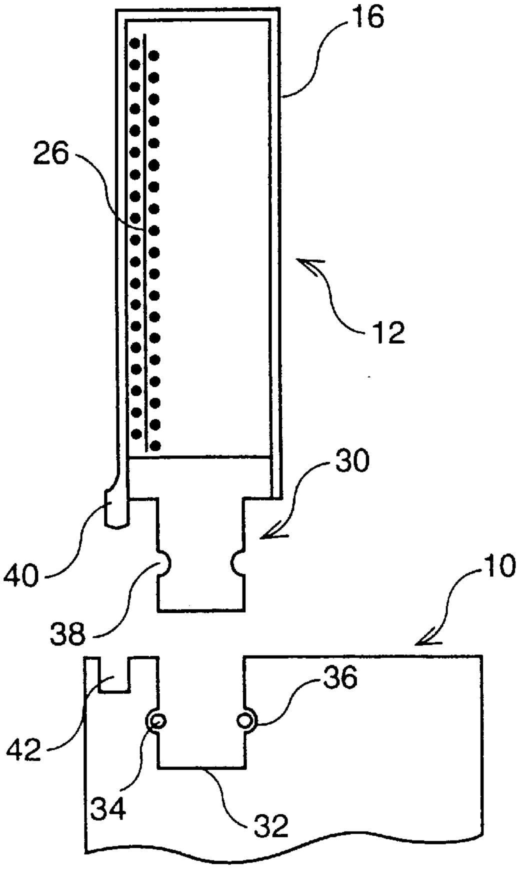
FIG. 3 is a schematic sectional representation of the antenna device and its off-centering means of a mobile telephone of the invention.

The antenna device 12 is shown in section in FIG. 3, with the helical antenna 26 covered by the antenna cap 16. The device 12 includes a plug 30 adapted to be inserted into the socket 32 to attach the antenna device 12 to the casing 10. The socket 32 includes a clipping mechanism or clip 34 adapted to engage in a recess 36 in the plug 32. In the absence of the antenna device the clip 34 is held away from the bottom of the recess 36 by a spring effect. When the plug 30 is inserted into the socket 32 it pushes the clip 34 back into the recess 36 until the plug is inserted sufficiently for the clip 34 to be level with the recess 38 on the plug 30. Because of the spring effect, the clip 34 then occupies the space formed by the two recesses 36 and 38, so locking the antenna device 12 to the casing 10.

Figure 4:
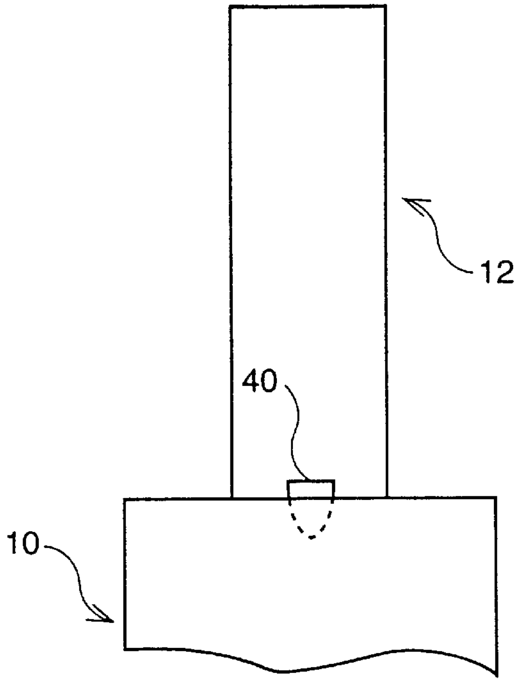
FIG. 4 is a schematic representation of the polarizer of the off-centering means of the mobile telephone from FIG. 3.

To ensure that when the antenna device 12 is fitted the antenna is always in the position farthest away from the head of the user, the antenna device includes a polarizer 40 adapted to be accommodated in a notch 42 on the casing 10. As can be seen in FIG. 4, showing the antenna device 12 installed on the casing 10, the polarizer 40 has a pointed shape defining a convex triangle with the apex at the bottom of the notch 42. Accordingly, to demount the antenna device, it is sufficient to turn the device so that when the sides of the triangle bear against the walls of the notch 42 the polarizer exerts an upward force which overcomes the spring effect of the clip 34.

Note that any fixing system can be used to fix the antenna device to the casing. Thus it is possible to use a plug incorporating a screwthread adapted to be screwed into a female screwthread of the socket. A bayonet mechanism or any other appropriate mechanism can also be used. In all cases, a polarizer must be provided for locking the antenna device with the antenna in the position farthest away from the head of the user.

In conclusion, the mobile telephone of the invention incorporates a mechanism preventing the antenna moving too close to the head of the user as the unit moves during a telephone call. The minimal distance resulting from the use of this mechanism is small, approximately 6 mm, but is sufficient to prevent the electromagnetic radiation emitted by the antenna being partially absorbed by the head of the user.

There is claimed:

1. A mobile telephone including an antenna external device attached to the casing of said telephone, said antenna device comprising:

an antenna element; and an antenna cap having a center axis running longitudinally through said cap covering said antenna element, wherein said antenna element is located off said center axis; and an attachment structure securing said antenna device to said casing in a position such that said antenna element is located on a side of said axis which is furthest away from a user's head when said mobile telephone is use so that said antenna is always separated from said head of said user by a minimal distance during a telephone call.

2. The antenna device of claim 1, wherein said antenna cap projects from said casing along said longitudinal axis.

3. The antenna device of claim 1, wherein said antenna element is embedded in a wall of said cap.

4. The telephone including an antenna device attached to the casing of said telephone comprising:

an antenna cap covering an antenna, which is situated near one wall of said antenna cap, said antenna device including such that, when said antenna device is fixed to said casing, said antenna is automatically placed at the position farthest away from the head of the user so that said antenna is always separated from said head of said user by a minimal distance during a telephone call during which said antenna device may be subject to movements such that it moves closer to said head of said user, wherein said antenna device includes a plug adapted to be locked into a socket on said casing and polarizer means adapted to penetrate a notch on said casing so that said antenna is always in said position farthest away from said head of said user when said antenna device has been fixed to said casing.

5. The telephone claimed in claim 4 wherein said socket on said casing of said telephone includes clip means adapted to enter by virtue of a spring effect into a recess in said plug of said antenna device when said antenna device is fixed to said casing.

6. The telephone claimed in claim 4 wherein said polarizer means have a triangular shape with an apex adapted to locate in the bottom of said notch so that said antenna device is demounted by turning said antenna device so that said polarizer means exert an upward force on lateral walls of said notch to overcome the force due to the spring effect of said clip means.

7. The telephone claimed in claim 4 wherein said antenna is a helical antenna having a small diameter.

8. The telephone claimed in claim 7 wherein said antenna device has a diameter of 8 mm and said minimal distance between said antenna and said head of said user is approximately 6 mm.

* * * * *